(12) United States Patent
Hodes et al.

(10) Patent No.: US 11,853,612 B2
(45) Date of Patent: Dec. 26, 2023

(54) CONTROLLED SYSTEM MANAGEMENT BASED ON STORAGE DEVICE THERMAL LOAD

(71) Applicant: Western Digital Technologies, Inc., San Jose, CA (US)

(72) Inventors: Avichay Haim Hodes, Kfar Ben-Nun (IL); Judah Gamliel Hahn, Ofra (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/714,863

(22) Filed: Apr. 6, 2022

(65) Prior Publication Data

US 2023/0325113 A1    Oct. 12, 2023

(51) Int. Cl.
G06F 3/06  (2006.01)

(52) U.S. Cl.
CPC .......... G06F 3/0659 (2013.01); G06F 3/0614 (2013.01); G06F 3/0635 (2013.01); G06F 3/0683 (2013.01)

(58) Field of Classification Search
CPC .......... G06F 3/06; G06F 1/20; G11B 33/142; G11C 7/20; G11C 7/24; G11C 5/02
See application file for complete search history.

(56) References Cited

U.S. PATENT DOCUMENTS

| | | | |
|---|---|---|---|
| 9,546,795 B2 | 1/2017 | Pienta et al. | |
| 9,753,465 B1 | 9/2017 | Ghose | |
| 9,930,109 B2 | 3/2018 | Saffre et al. | |
| 10,528,098 B2 | 1/2020 | Amin-Shahidi et al. | |
| 2016/0086675 A1 | 3/2016 | Ray et al. | |
| 2016/0162219 A1* | 6/2016 | Erez | G06F 1/206 711/103 |
| 2016/0364175 A1* | 12/2016 | Yang | G06F 3/0647 |
| 2017/0003889 A1* | 1/2017 | Kim | G06F 3/067 |
| 2019/0073154 A1* | 3/2019 | Gwin | G06F 3/0679 |
| 2019/0114212 A1 | 4/2019 | Gwin | |

(Continued)

FOREIGN PATENT DOCUMENTS

KR    20180110574 A    10/2018
WO       2019154739 A1    8/2019

OTHER PUBLICATIONS

NVM Express Base Specification Revision 1.4 (Year: 2019).*

*Primary Examiner* — Khoa D Doan
(74) *Attorney, Agent, or Firm* — PATTERSON + SHERIDAN, LLP; Steven H. VerSteeg

(57) ABSTRACT

A storage system includes two or more data storage devices and a controller coupled to the two or more data storage devices. Each data storage device of the two or more data storage devices includes zoned namespace (ZNS) architecture. The controller is configured to collect thermal statistics for each data storage device of the two or more data storage devices, analyze the collected thermal statistics, and designate a zone by selecting one or more dies within at least one data storage device of the two or more data storage devices based on the analyzed collected thermal statistics. The data storage device includes a memory device having a plurality of dies and a controller coupled to the memory device. The controller is configured to collect thermal statistics for each die of the plurality of dies, analyze the collected statistics, and allocate one or more dies to form a zone.

19 Claims, 9 Drawing Sheets

(56) References Cited

U.S. PATENT DOCUMENTS

| | | |
|---|---|---|
| 2020/0333976 A1* | 10/2020 | Cariello .............. G06F 11/3034 |
| 2021/0089217 A1* | 3/2021 | Bjørling .................. G06F 3/064 |
| 2021/0132827 A1 | 5/2021 | Helmick et al. |
| 2021/0240388 A1* | 8/2021 | Hazeghi ................ G06F 3/0679 |
| 2021/0405874 A1 | 12/2021 | Kono et al. |
| 2021/0406174 A1 | 12/2021 | Gole et al. |
| 2022/0147279 A1* | 5/2022 | Goss .................... G06F 3/0604 |
| 2022/0398026 A1* | 12/2022 | Avila-Hernandez ..... G11C 7/04 |

* cited by examiner

CONTROLLED SYSTEM MANAGEMENT BASED ON STORAGE DEVICE THERMAL LOAD

BACKGROUND OF THE DISCLOSURE

Field of the Disclosure

Embodiments of the present disclosure generally relate to storage systems having data storage devices, such as solid state drives (SSDs) using zoned namespace architecture, and, more specifically, programming data based on thermal statistics and load balancing of the storage system and the data storage devices.

Description of the Related Art

Enterprise data storage devices typically have a large capacity, which requires a plurality of dies in a large form factor. Since enterprise performance expectations tend to be line-rate, the enterprise data storage devices also require a lot of power, which may lead to a high thermal load. The thermal load may be distributed among the dies of the plurality of dies. Because the workload may not be evenly spread throughout the dies of the plurality of dies, certain parts of the enterprise data storage device may be hotter than other parts of the enterprise data storage device based on workload and use. For example, dies experiencing greater use or workloads may have higher temperatures than dies experiencing less use or workloads.

Additionally, because of die manufacturing variability, power consumption for each die may be different depending on which die is targeted in the workload. Furthermore, physical proximity to an airflow source for each die may cause a difference in temperatures in the plurality of dies. Likewise, the location of each die may also affect the neighboring dies. Thus, the thermal load and the potential throughput may be impacted by the thermal profile of the enterprise data storage device. In order to reduce the temperature of a data storage device that reached or exceeded a threshold temperature, thermal throttling may be used. However, thermal throttling reduces performance of the data storage device, which may cause the data storage device to not reach performance expectations.

Therefore, there is a need in the art for an improved workload and thermal load balancing within a storage system and within a data storage device.

SUMMARY OF THE DISCLOSURE

The present disclosure generally relates to storage systems having data storage devices, such as solid state drives (SSDs) using zoned namespace architecture, and, more specifically, programming data based on thermal statistics and load balancing of the storage system and the data storage devices. A storage system includes two or more data storage devices and a controller coupled to the two or more data storage devices. Each data storage device of the two or more data storage devices includes zoned namespace (ZNS) architecture. The controller is configured to collect thermal statistics for each data storage device of the two or more data storage devices, analyze the collected thermal statistics, and designate a zone by selecting one or more dies within at least one data storage device of the two or more data storage devices based on the analyzed collected thermal statistics. The data storage device includes a memory device having a plurality of dies and a controller coupled to the memory device. The controller is configured to collect thermal statistics for each die of the plurality of dies, analyze the collected statistics, and allocate one or more dies to form a zone.

In one embodiment, a storage system includes two or more data storage devices, where each data storage device of the two or more data storage devices includes zoned namespace (ZNS) architecture, and a controller coupled to the two or more data storage devices. The controller is configured to collect thermal statistics for each data storage device of the two or more data storage devices, analyze the collected thermal statistics, and designate a zone by selecting one or more dies within at least one data storage device of the two or more data storage devices based on the analyzed collected thermal statistics.

In another embodiment, a data storage device includes a memory device having zoned namespace (ZNS) architecture, where the memory device includes a plurality of dies, and a controller coupled to the memory device. The controller is configured to collect thermal statistics for each die of the plurality of dies, analyze the collected statistics, and allocate one or more dies of the plurality of dies to form a zone.

In another embodiment, a storage system includes two or more memory means and a controller coupled to the two or more memory means. The controller is configured to allocate a zone formed from a portion of one or more of the two or more memory means based on thermal statistics of each memory means of the two or more memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to storage systems having data storage devices, such as solid state drives (SSDs) using zoned namespace architecture, and, more specifically, programming data based on thermal statistics and load balancing of the storage system and the data storage devices. A storage system includes two or more data storage devices and a controller coupled to the two or more data storage devices. Each data storage device of the two or more data storage devices includes zoned namespace (ZNS) architecture. The controller is configured to collect thermal statistics for each data storage device of the two or more data storage devices, analyze the collected thermal statistics, and designate a zone by selecting one or more dies within at least one data storage device of the two or more data storage devices based on the analyzed collected thermal statistics. The data storage device includes a memory device having a plurality of dies and a controller coupled to the memory device. The controller is configured to collect thermal statistics for each die of the plurality of dies, analyze the collected statistics, and allocate one or more dies to form a zone.

Figure 1:
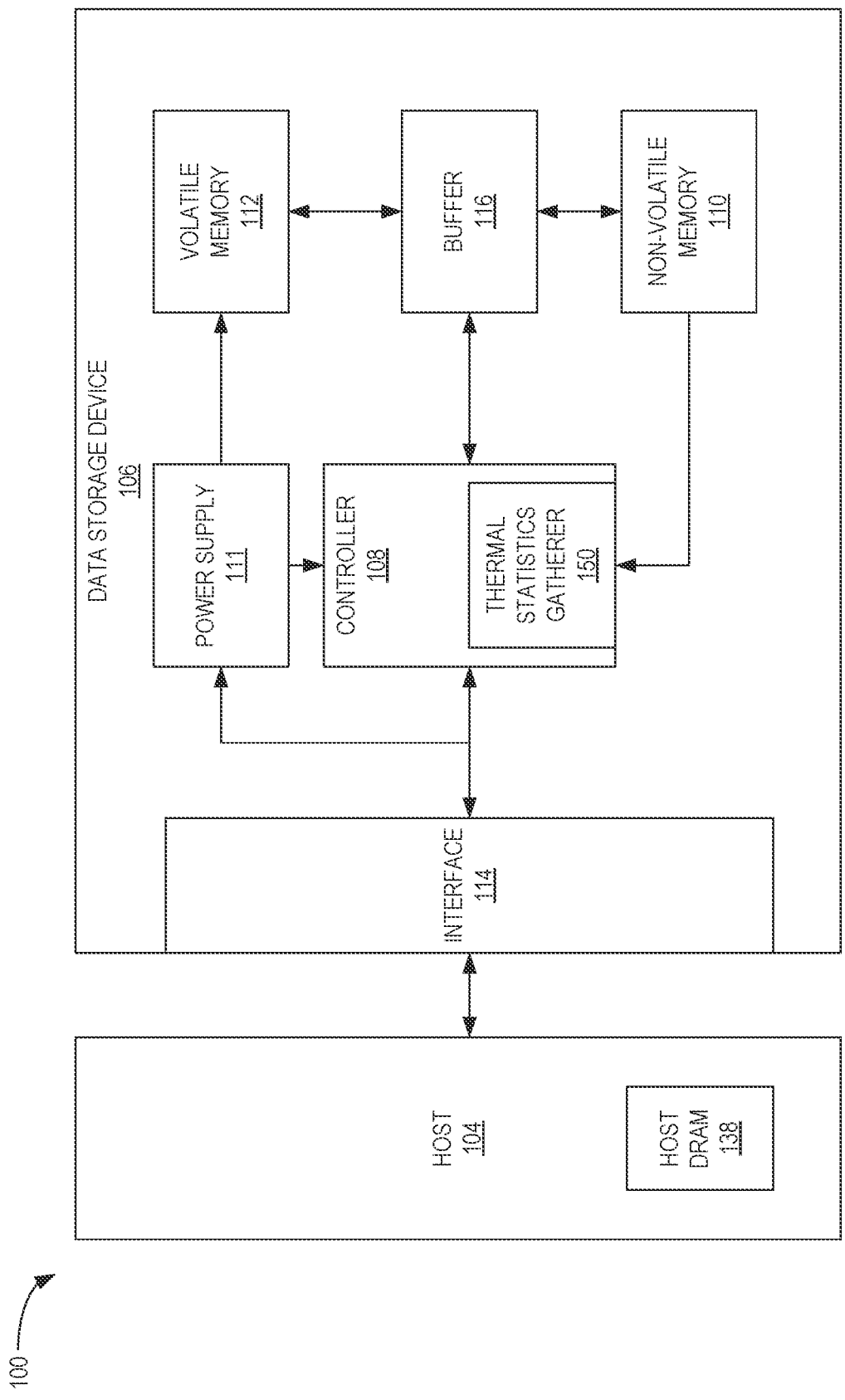
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104. The storage system 100 may be an enterprise storage system or a client storage system. Both the enterprise storage system and the client storage system includes one or more data storage devices, where the enterprise storage system includes greater than or equal to a threshold number of data storage devices and the client storage system includes less than the threshold number of data storage devices.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller includes a thermal statistics gatherer module 150. The thermal statistics gatherer module 150 is coupled to the NVM 110. The thermal statistics gatherer module 150 may be configured to retrieve the thermal statistics of the NVM 110, where the thermal statistics may be a temperature of each region of a plurality of regions of the NVM 110. In one embodiment, each region may be different memory devices of the NVM 110, where the different memory devices has different memory architectures (e.g., SLC memory, MLC memory, TLC memory, QLC memory, PLC memory, and the like). In another embodiment, each region may include two or more adjacent dies of a plurality of dies of the NVM 110. In yet another embodiment, each region includes a die of a plurality of dies of the NVM 110. The thermal statistics gatherer module 150 may be configured to generate a temperature profile or a heat map of the NVM 110.

Figure 2:
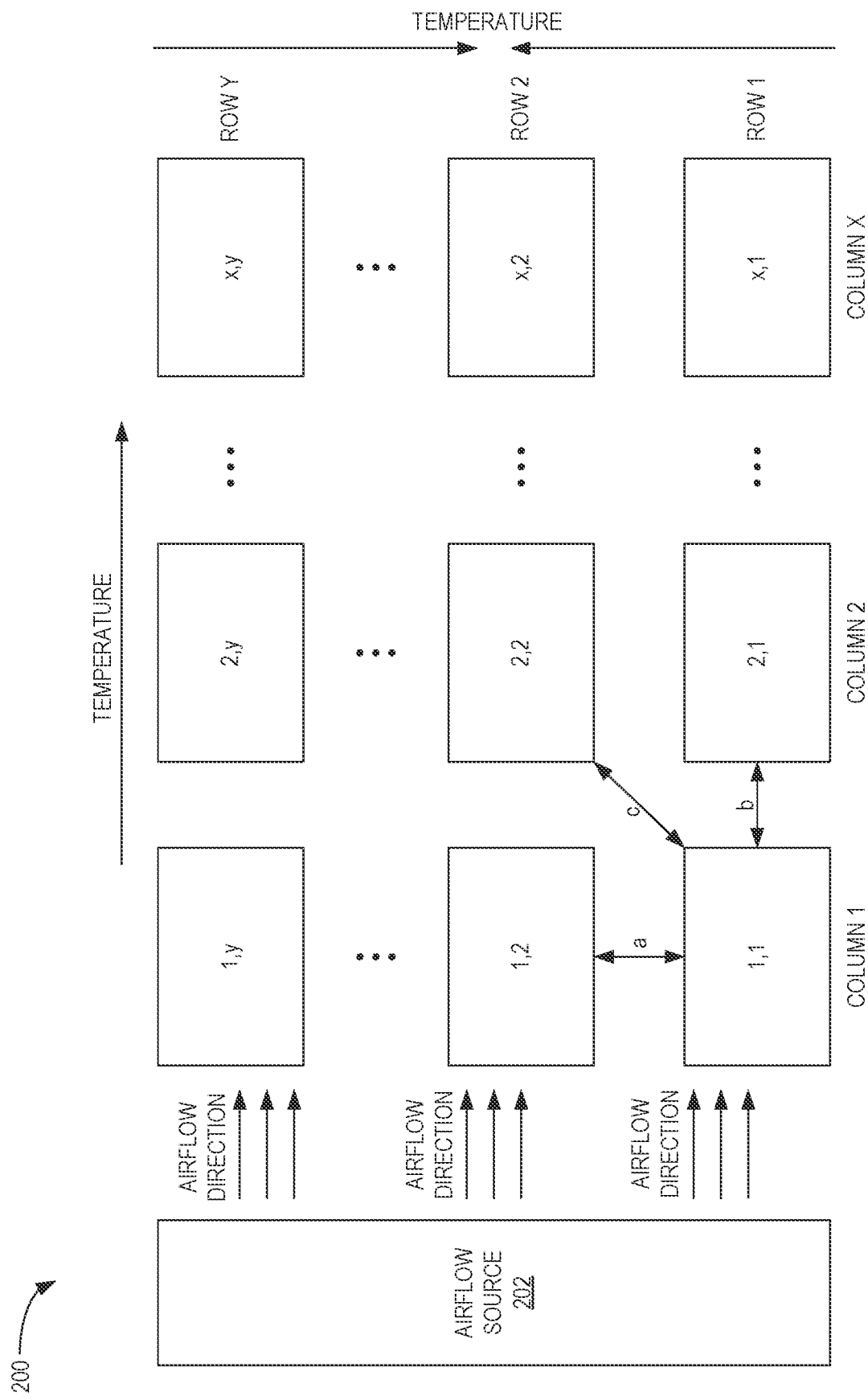
FIG. 2 is an exemplary illustration of a storage system having a plurality of data storage devices, according to certain embodiments.

FIG. 2 is an exemplary illustration of a storage system 200 having a plurality of data storage devices, where each data storage device of the plurality of data storage devices may be the data storage device 106 of FIG. 1, according to certain embodiments. The plurality of data storage devices are represented as points in a coordinate system, where each point, such as (1,1), represents a data storage device in the storage system 200. The storage system 200 may include any number of data storage devices, such that it may include "x" times "y" amount of data storage devices. The data storage devices in the storage system 200 may be arranged in rows and columns. It is to be understood that the configuration depicted is not intended to be limiting and is only provided as an exemplary embodiment. For example, the storage system may have a different configuration pattern other than rows and columns. It is to be further understood that although a planar arrangement of data storage devices is illustrated, the storage system 200 may have a stacked configuration. In other words, there may be data storage devices above and/or below the depicted exemplary illustration of the storage system 200.

Each data storage device is separated from an adjacent data storage device in order to allow for airflow from an airflow source 202, physical components (e.g., wiring), and the like. For example, the data storage device located at (1,1) is a distance of "a" from an adjacent data storage device located at (1,2), a distance of "b" from an adjacent data storage device located at (2,1), and a distance of "c" from a diagonally adjacent data storage device located at (2,2). It is to be understood that "a", "b", and "c" may be the same or different. Likewise, in embodiments where the data storage devices are stacked, a distance between adjacently stacked data storage devices is contemplated. In the storage system 200, a temperature profile exists between each of the data storage devices. The temperature profile may be dependent on several factors, such as the distance between adjacent data storage devices (e.g., "a", "b", and "c"), the proximity of a data storage device to the center of the storage system 200, a workload of a data storage device, a distance of a data storage device from the airflow source 202, and the like. For example, a data storage device the center of the storage system 200 may dissipate heat slower than data storage devices towards the edges of the storage system 200. Likewise, a data storage device that is closer in proximity to the airflow source 202 may be cooler than data storage devices that are further in proximity to the airflow source 202. In another example, a data storage device that has a higher workload may be hotter than a data storage device that has a lower workload. The thermal relationships between adjacent data storage devices may be predetermined or derived using a fixed benchmark that runs on each of the data storage devices operation. In one example, analyzing the collected thermal statistics occurs during an offline storage system management period, such as when the storage system 200 is idle.

Figure 3A:
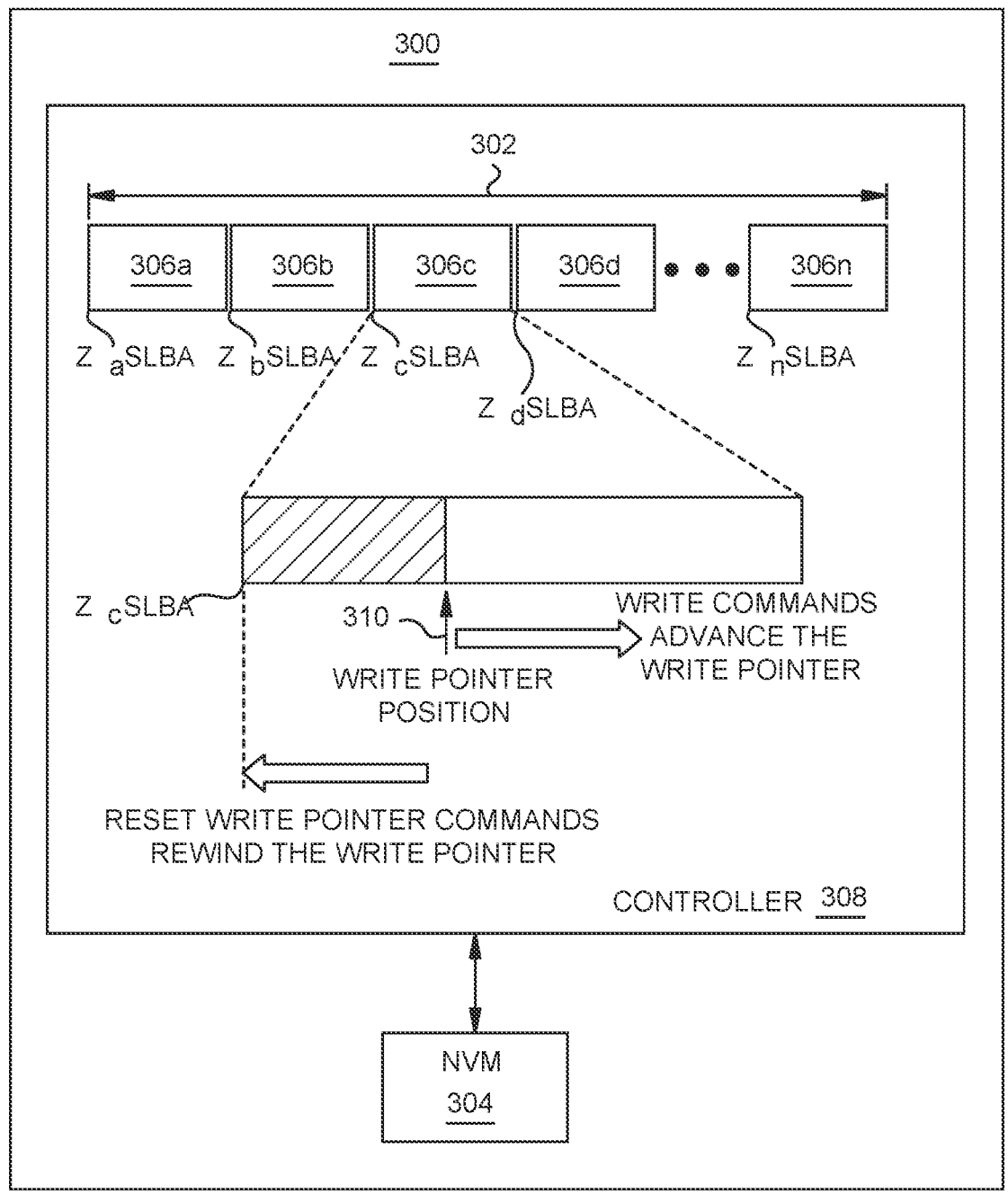
FIG. 3A is an exemplary illustration of a zoned namespace utilized in a storage device, according to certain embodiments.

FIG. 3A is an exemplary illustration of a Zoned Namespaces (ZNS) 302 view utilized in a data storage device 300, according to certain embodiments. The data storage device 300 may present the ZNS 302 view to a host device, such as the host device 104 of FIG. 1. The data storage device 300 may be the data storage device 106 of the storage system 100 of FIG. 1. The data storage device 300 may have one or more ZNS 302, and each ZNS 302 may be different sizes. The data storage device 300 may further comprise one or more conventional namespaces in addition to the one or more Zoned Namespaces 302. Moreover, the ZNS 302 may be a zoned block command (ZBC) for SAS and/or a zoned-device ATA command set (ZAC) for SATA. Host side zone activity may be more directly related to media activity in zoned drives due to the relationship of logical to physical activity possible.

In the data storage device 300, the ZNS 302 is the quantity of NVM that can be formatted into logical blocks such that the capacity is divided into a plurality of zones 306a-306n (collectively referred to as zones 306). The NVM may be the storage unit or NVM 110 of FIG. 1. Each of the zones 306 comprise a plurality of physical or erase blocks (not shown) of a memory unit or NVM 304, and each of the erase blocks are associated a plurality of logical blocks (not shown). Each of the zones 306 may have a size aligned to the capacity of one or more erase blocks of a NVM or NAND device. When the controller 308 receives a command, such as from a host device (not shown) or the submission queue of a host device, the controller 308 can read data from and write data to the plurality of logical blocks associated with the plurality of erase blocks (EBs) of the ZNS 302. Each of the logical blocks is associated with a unique LBA or sector.

In one embodiment, the NVM 304 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 306 to track where the data is located within the NVM 304. Data may be written to one zone 306 at a time until a zone 306 is full, or to multiple zones 306 such that multiple zones 306 may be partially full. Similarly, when writing data to a particular zone 306, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 308 selects the erase blocks that will store the data for each zone, the controller 308 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 308 may use the time difference to select a more optimal erase block in a just-in-time basis. The decision of which erase block is allocated and assigned for each zone and its contiguous LBAs can be occurring for zero or more concurrent zones at all times within the controller 308.

Each of the zones 306 is associated with a zone starting logical block address (ZSLBA) or zone starting sector. The ZSLBA is the first available LBA in the zone 306. For example, the first zone 306a is associated with $Z_a$SLBA, the second zone 306b is associated with $Z_b$SLBA, the third zone 306c is associated with $Z_c$SLBA, the fourth zone 306d is associated with $Z_d$SLBA, and the nth zone 306n (i.e., the last zone) is associated with $Z_n$SLBA. Each zone 306 is identified by its ZSLBA, and is configured to receive sequential writes (i.e., writing data to the NVM 110 in the order the write commands are received).

As data is written to a zone 306, a write pointer 310 is advanced or updated to point to or to indicate the next available block in the zone 306 to write data to in order to track the next write starting point (i.e., the completion point of the prior write equals the starting point of a subsequent write). Thus, the write pointer 310 indicates where the subsequent write to the zone 306 will begin. Subsequent write commands are 'zone append' commands, where the data associated with the subsequent write command appends to the zone 306 at the location the write pointer 310 is indicating as the next starting point. An ordered list of LBAs within the zone 306 may be stored for write ordering. Each zone 306 may have its own write pointer 310. Thus, when a write command is received, a zone is identified by its ZSLBA, and the write pointer 310 determines where the write of the data begins within the identified zone.

Figure 3B:
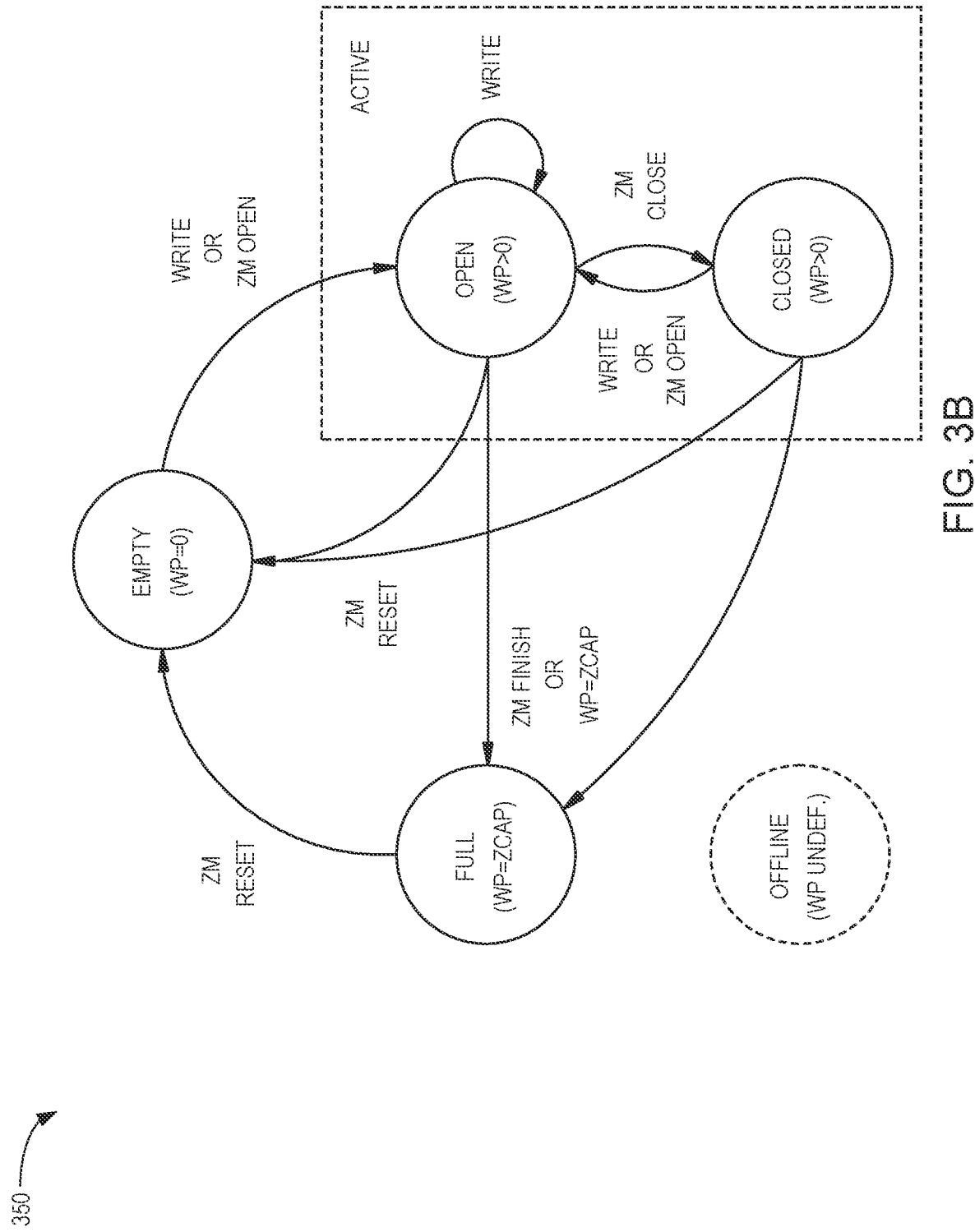
FIG. 3B is an exemplary illustration of a state diagram for the zoned namespaces of the storage device of FIG. 3A, according to certain embodiments.

FIG. 3B is an exemplary illustration of a state diagram 350 for the ZNS 302 of the data storage device 300 of FIG. 3A, according to certain embodiments. In the state diagram 350, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 308 comprises the ZM. Zone metadata may be stored in the ZM and/or the controller 308.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the data storage device 300 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB, 512 MiB, or 2 GiB. However, a small portion of each zone may be inaccessible to write data to, but may still be read, such as a portion of each zone storing the parity data and one or more excluded erase blocks. For example, if the total capacity of a zone 206 is 512 MiB, then the ZCAP may be 470 MiB, which is the capacity available to write data to, while 42 MiB are unavailable to write data. In another example, if the total capacity of a zone 306 is 2 GiB, then the ZCAP may be 1077 MiB. The writeable capacity (ZCAP) of a zone is equal to or less than the total zone storage capacity. The data storage device 300 may determine the ZCAP of each zone upon zone reset. For example, the controller 308 or the ZM may determine the ZCAP of each zone. The data storage device 300 may determine the ZCAP of a zone when the zone is reset. It is to be understood that the previously listed total capacity and ZCAP values are not intended to be limiting, but to provide examples of possible embodiments.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 300 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 300. The data storage device 300 may mark one or more erase blocks for erasure. When a new zone is going to be formed and the data storage device 300 anticipates a ZM open, the one or more erase blocks marked for erasure may then be erased. The data storage device 300 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 310 for the zone 306 may be selected, enabling the zone 306 to be tolerant to receive commands out of sequential order. The write pointer 310 may optionally be turned off such that a command may be written to whatever starting LBA is indicated for the command.

Referring back to FIG. 3A, when the host device 104 sends a write command to write data to a zone 306, the controller 308 pulls-in the write command and identifies the write command as a write to a newly opened zone 306. The controller 308 selects a set of EBs to store the data associated with the write commands of the newly opened zone 306 to, and the newly opened zone 306 switches to an active zone 306. The write command may be a command to write new data, or a command to move valid data to another zone for garbage collection purposes. The controller 308 is configured to DMA read new commands from a submission queue populated by a host device.

In an empty zone 306 just switched to an active zone 306, the data is assigned to the zone 306 and the associated set of sequential LBAs of the zone 306 starting at the ZSLBA, as the write pointer 310 is indicating the logical block associated with the ZSLBA as the first available logical block. The data may be written to one or more erase blocks or NAND locations that have been allocated for the physical location of the zone 306. After the data associated with the write command has been written to the zone 306, a write pointer 310 is updated to point to the next LBA available for a host write (i.e., the completion point of the first write). The write data from this host write command is programmed sequentially into the next available NAND location in the erase block selected for physical backing of the zone.

For example, the controller 308 may receive a first write command to a third zone 306c, or a first zone append command. The host device 104 identifies sequentially which logical block of the zone 306 to write the data associated with the first command to. The data associated with the first command is then written to the first or next available LBA(s) in the third zone 306c as indicated by the write pointer 310, and the write pointer 310 is advanced or updated to point to the next available LBA available for a host write (i.e., WP>0). If the controller 308 receives a second write command to the third zone 306c, or a second zone append command, the data associated with the second write command is written to the next available LBA(s) in the third zone 306c identified by the write pointer 310. Once the data associated with the second command is written to the third zone 306c, the write pointer 310 once again advances or updates to point to the next available LBA available for a host write. Resetting the third zone 306c moves the write pointer 310 back to the $Z_c$SLBA (i.e., WP=0), and the third zone 306c switches to an empty zone.

In the description herein, the term "erase block" may be referred to as "block" for simplification purposes.

Figure 4:
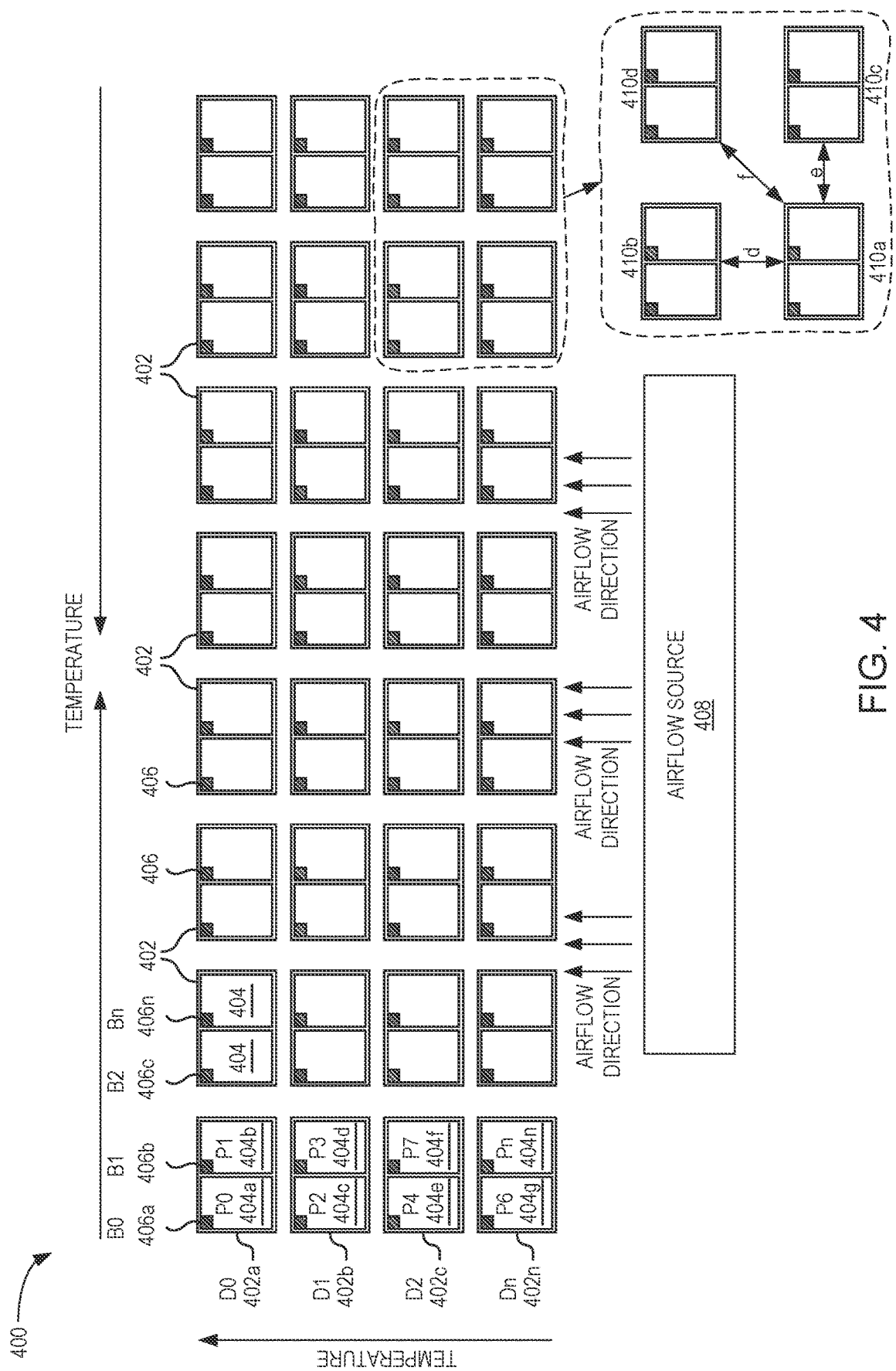
FIG. 4 is an exemplary illustration of forming a zone in a memory device, according to certain embodiments.

FIG. 4 is an exemplary illustration of forming a zone, such as the first zone 306a of FIG. 3A, in a memory device 400, according to certain embodiments. The memory device 400 includes a plurality of dies 402a-402n, collectively referred to as dies 402, where each die of the plurality of dies 402a-402n includes a first plane 404a and a second plane 404b, collectively referred to as planes 404. It is to be understood that each die include more than two planes (e.g., 4 planes, 8 planes, etc.). It is to be understood that the embodiments herein may be applicable to any die architecture having one or more planes. Each of the planes 404 includes a plurality of blocks 406a-406n, collectively referred to as block 406. While 32 dies 402 are shown in the memory device 400, any number of dies may be included.

Each die may be separated from an adjacent die in order to allow for airflow from an airflow source 408, physical components (e.g., wiring), and the like. For example, die 410a is a distance of "d" from an adjacent die 410b, a distance of "e" from an adjacent die 410c, and a distance of "f" from a diagonally adjacent die 410d. It is to be understood that "d", "e", and "f" may be the same or different. Likewise, in embodiments where the dies are stacked, a distance between adjacently stacked dies is contemplated. In the memory device 400, a temperature profile exists between each of the plurality of dies 402a-402n. The temperature profile may be dependent on several factors, such as the distance between adjacent dies (e.g., "d", "e", and "f"), the proximity of a die to the center of the memory device 400, a workload of a die, a distance of a die from the airflow source 408, and the like. For example, a die the center of the memory device 400 may dissipate heat slower than dies towards the edges of the memory device 400. Likewise, a die that is closer in proximity to the airflow source 408 may be cooler than dies that are further in proximity to the airflow source 408. In another example, a die that has a higher workload may be hotter than a die that has a lower workload. The thermal relationships between adjacent dies may be predetermined or derived using a fixed benchmark that analyzes the temperature and usage of each die. In one example, analyzing the collected thermal statistics occurs during an offline storage system management period, such as when the memory device 400 is idle.

A zone, such as the first zone 306a of FIG. 3A, includes a block 406 from each plane 404 of each die 402. In some examples, a zone may include one or more blocks 406 from each plane 404 of each die 402. Furthermore, in some embodiments, one or more dies of the dies 402 of the memory device 400 may be provisioned for storing XOR or parity data. The zone may be formed based on a physical temperature profile of the dies 402, such that the block selected from a die is based on reducing an overall temperature increase of the memory device 400.

Furthermore, data is written sequentially from block to block in a first zone so that data is written to B0 406a before data is written to B1 406b. Data is also written sequentially from zone to zone so that data is written from a first zone before data is written to a second zone. A zone may have any writeable capacity (ZCAP), such as 256 MiB or 512 MiB, as discussed above. Each zone of a plurality of zones may have the same zone capacity. Data is erased in the zone capacity size when a data storage device, such as the data storage device 106 of FIG. 1, receives a zone reset request (or in some cases, generates a zone reset request as part of a data management operation, such as garbage collection). In other words, individual blocks cannot be erased unless an entire zone is erased or moved to the Zone Empty state (i.e., zone empty), as described in FIG. 3B. However, if the data storage device 106 comprises a non-volatile memory that has partial capability of ZNS, data is erased from the data storage device 106 in the zone capacity size in the portion of the non-volatile memory that has ZNS capability. Data may be erased from a non-ZNS capable non-volatile storage unit in a block size.

Furthermore, the location of the data stored in a ZNS-enabled portion of the NVM, such as the NVM 110 of FIG. 1, is recorded in a first logical to physical (L2P) table as LBAs in a volatile memory unit, such as the volatile memory 112. The location of the data stored in a non-ZNS-enabled portion of the NVM, such as the NVM 110 of FIG. 1, is recorded in a second L2P table as LBAs in a volatile memory unit, such as the volatile memory 112. The volatile memory 112 may be a DRAM unit. Furthermore, the NVM 110 may include a first L2P table that matches the first L2P table of the volatile memory 112 and a second L2P table that matches the second L2P table of the volatile memory 112. The L2P tables in the NVM 110 are updated to match the L2P tables of the volatile memory 112.

The L2P tables include pointers that point to each physical location of the data within the NVM 110. The physical location of the data is mapped in a logical array, such that the pointer address array comprises the location mapped from die to NAND location. In a block, the total number of pointers is calculated as follows: 256 WL*3 Pages/WL*4 Slots/Page*1 pointer/slot=3,072 pointers. Within a first zone at capacity comprising 62 blocks, 190,464 pointers may exist (i.e., 3,072 pointers/block*62 blocks=190,464 pointers). Each pointer comprises a certain amount of data that utilizes the available storage of the volatile memory 112 and/or the NVM 110. Although TLC memory is exemplified, the embodiments herein are not limited to TLC memory and the embodiments described herein may be applicable to other memory densities, such as SLC memory, MLC memory, QLC memory, PLC memory, and the like.

Figure 5:
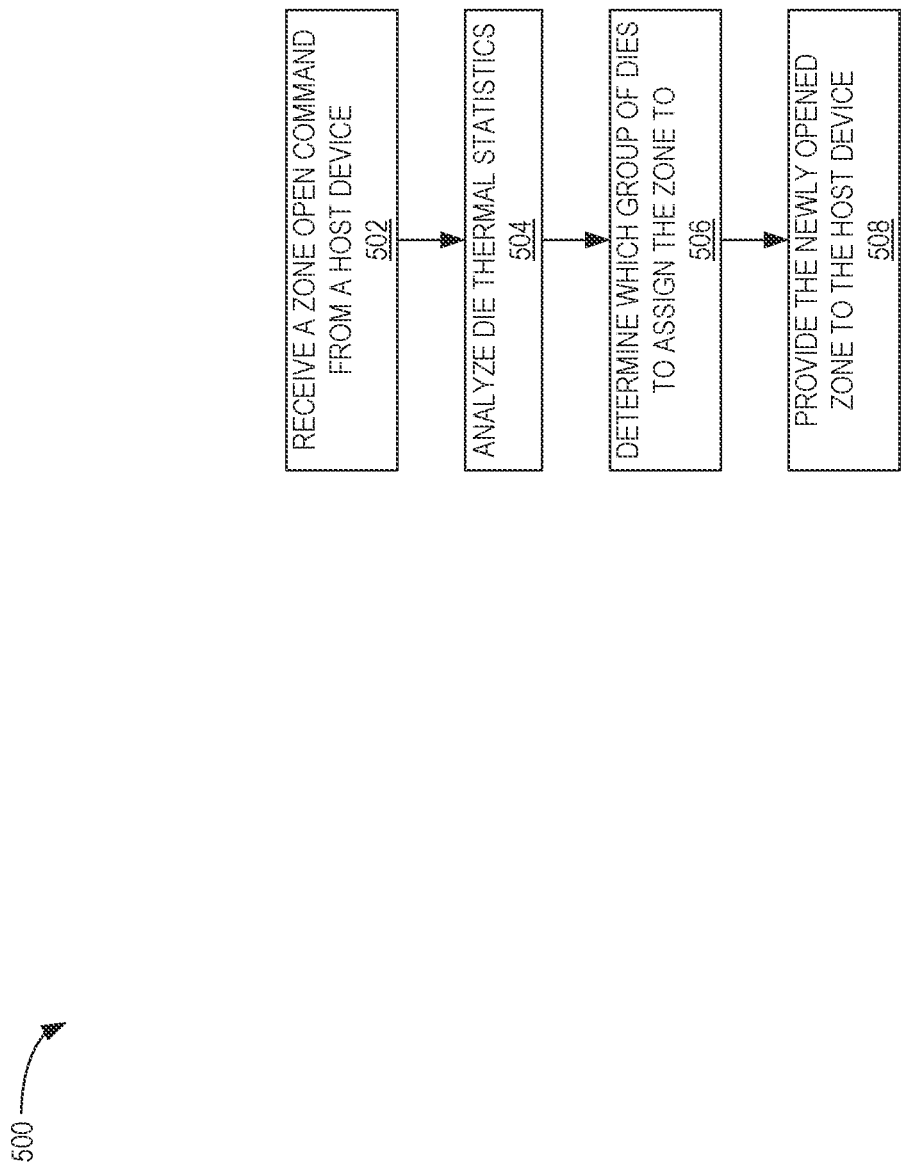
FIG. 5 is a flow diagram illustrating a method of providing a zone to a host device, according to certain embodiments.

FIG. 5 is a flow diagram illustrating a method 500 of providing a zone, such as the first zone 306a of FIG. 3A, to a host device, such as the host device 104 of FIG. 1, according to certain embodiments. Method 500 may be implemented by a controller, such as the controller 108 of FIG. 1. For exemplary purposes, aspects of the memory device 400 of FIG. 4 and the storage system 100 of FIG. 1 may be referenced herein. At block 502, the controller 108 receives a zone open command from the host device 104. The zone open command may be received explicitly (e.g., designated with the command) or implicitly (e.g., command does not include a zone open command, but the command is directed to a zone that is not yet open). At block 504, the controller 108 analyzes the die thermal statistics. For example, the controller 108 may utilize the thermal statistics gatherer module 150 to gather the thermal statistics of each die and analyze each die, such that a thermal profile of the dies may be generated. At block 506, the controller 108 determines which group of dies to assign the zone to. At block 508, the controller 108 provides the newly opened zone to the host device 104.

In another embodiment, the physical location of a conventional namespace can be chosen based on the die temperature profile. A conventional namespace is a non-ZNS namespace in a ZNS device. The conventional namespace may be a very small region, in which random writes are permitted. The conventional namespace may be located on a group of dies, much like a zone, and can be moved from die group to die group based on thermal statistics of the dies.

Figure 6:
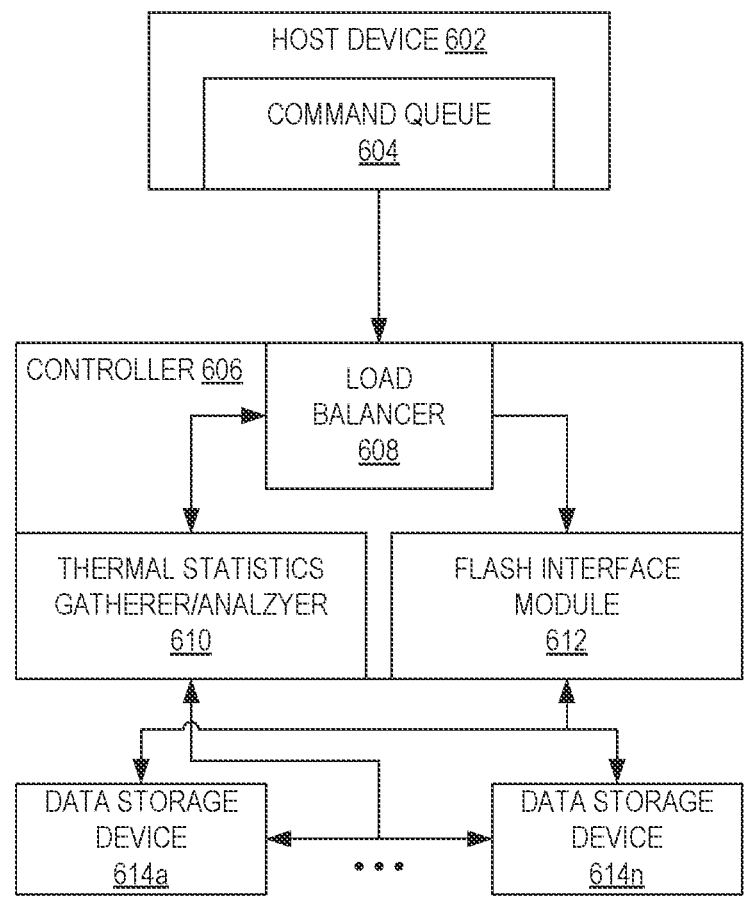
FIG. 6 is a schematic block diagram illustrating a storage system that includes a controller coupled to a plurality of data storage devices, where the controller includes a load balancer and a thermal statistics gatherer/analyzer module, according to certain embodiments.

FIG. 6 is a schematic block diagram illustrating a storage system 600 that includes a controller 606 coupled to a plurality of data storage devices 614a-614n, where the controller 606 includes a load balancer 608 and a thermal statistics gatherer/analyzer module 610 (which may be separate components), according to certain embodiments. The controller 606 further includes a flash interface module (FIM) 612. In one example, the thermal statistics gatherer/analyzer module 610 may be disposed in the FIM 612. The storage system 600 may be the storage system 200 of FIG. 2, where the controller 606 manages the input/output traffic from one or more host devices to the plurality of data storage devices 614a-614n. Each of the data storage devices 614a-614n may be the data storage device 106 of FIG. 1. It is to be understood that the one or more host devices may not be directly coupled, but linked via a network structure.

The controller 606 is coupled to a host device 602, where the host device 602 includes a command queue 604. The host device 602 generates commands and stores the generated commands in the command queue 604. In some examples, the host device 602 may send an indication to the controller 606 to fetch the generated commands stored in the command queue 604. In other examples, the host device 602 may send the generated commands from the command queue 604 to the controller 606.

The load balancer 608 may be configured to balance the future workload and the thermal load of each of the data storage devices 614a-614n. Furthermore, the thermal statistics gatherer/analyzer module 610 may be configure to collect and analyze the thermal statistics from each of the plurality of data storage devices 614a-614n. For example, the analyzation may also include determining the thermal impact of allocating a command from the command queue 604 to a data storage device and how allocating a command from the command queue 604 to the data storage device may affect the temperature profiles of the adjacent data storage devices. Based on the results of the thermal statistics gatherer/analyzer module 610, the load balancer 608 sends the received command from the command queue 604 to the FIM 612, where the FIM 612 passes the command to a target data storage device.

In one example, each data storage device of the plurality of data storage devices 614a-614n may also include a thermal statistics gatherer/analyzer module, such that the thermal statistics gatherer/analyzer module of each data storage devices sends feedback to the host device 602. The host device 602 may modify the command queue 604 based on the feedback by adding or removing jobs or commands based on the thermal load of each data storage device.

Figure 7:
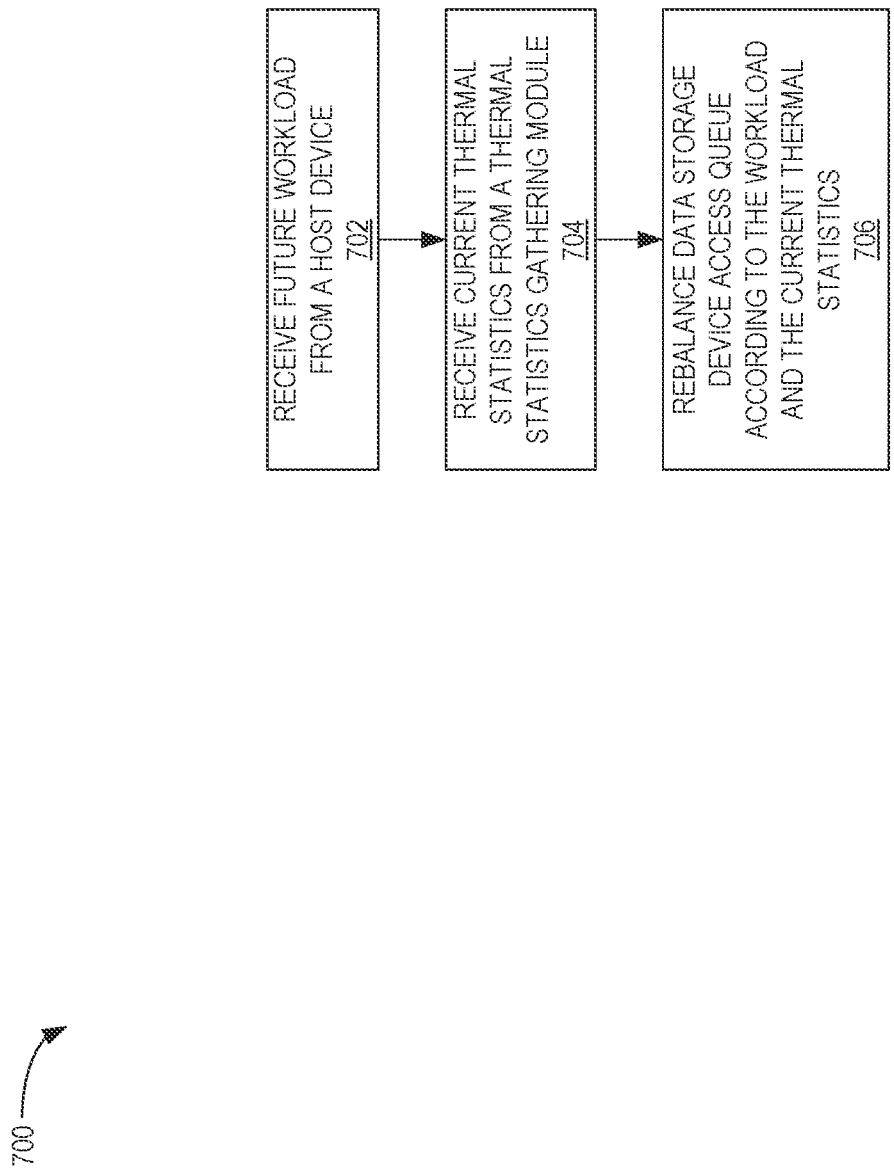
FIG. 7 is a flow diagram illustrating a method of rebalancing an access queue of a data storage device, according to certain embodiments.

FIG. 7 is a flow diagram illustrating a method 700 of rebalancing an access queue of a data storage device, such as one of the plurality of data storage devices 614a-614n of FIG. 6, according to certain embodiments. Method 700 may be implemented by controller 606 of FIG. 6. For exemplary purposes, aspects of the storage system 600 of FIG. 6 may be referenced herein. At block 702, the controller 606 receives a future workload from the host device 602. At block 704, the controller 606 receives current thermal statistics from the thermal statistics gatherer/analyzer module 610. At block 706, the controller 606 rebalances the access queue of the plurality of data storage devices 614a-614n according to the workload and the current thermal statistics.

Rebalancing the access queue of the plurality of data storage devices 614a-614n may be done using different approaches based on optimization techniques. For example, the optimization may follow a greedy schedule where the thermal requirements of each data storage device are satisfied one by one. When the thermal requirements of a data storage device are not satisfied with the current schedule, the data storage device gets pushed in the access queue to the next slot that satisfies thermal requirements of the data storage device. The controller 606 may also check that no other previously satisfied thermal requirements of a data storage device were turned unsatisfied by pushing the data storage device in the access queue. The controller 606 may also consider the latency priority, such that a relatively "hot" data storage may not be the last data storage device to access. For example, the latency priority may be implemented using a token based system, such that each data storage device that waits in the access queue receives a token that increases its priority in the next time slot.

Figure 8:
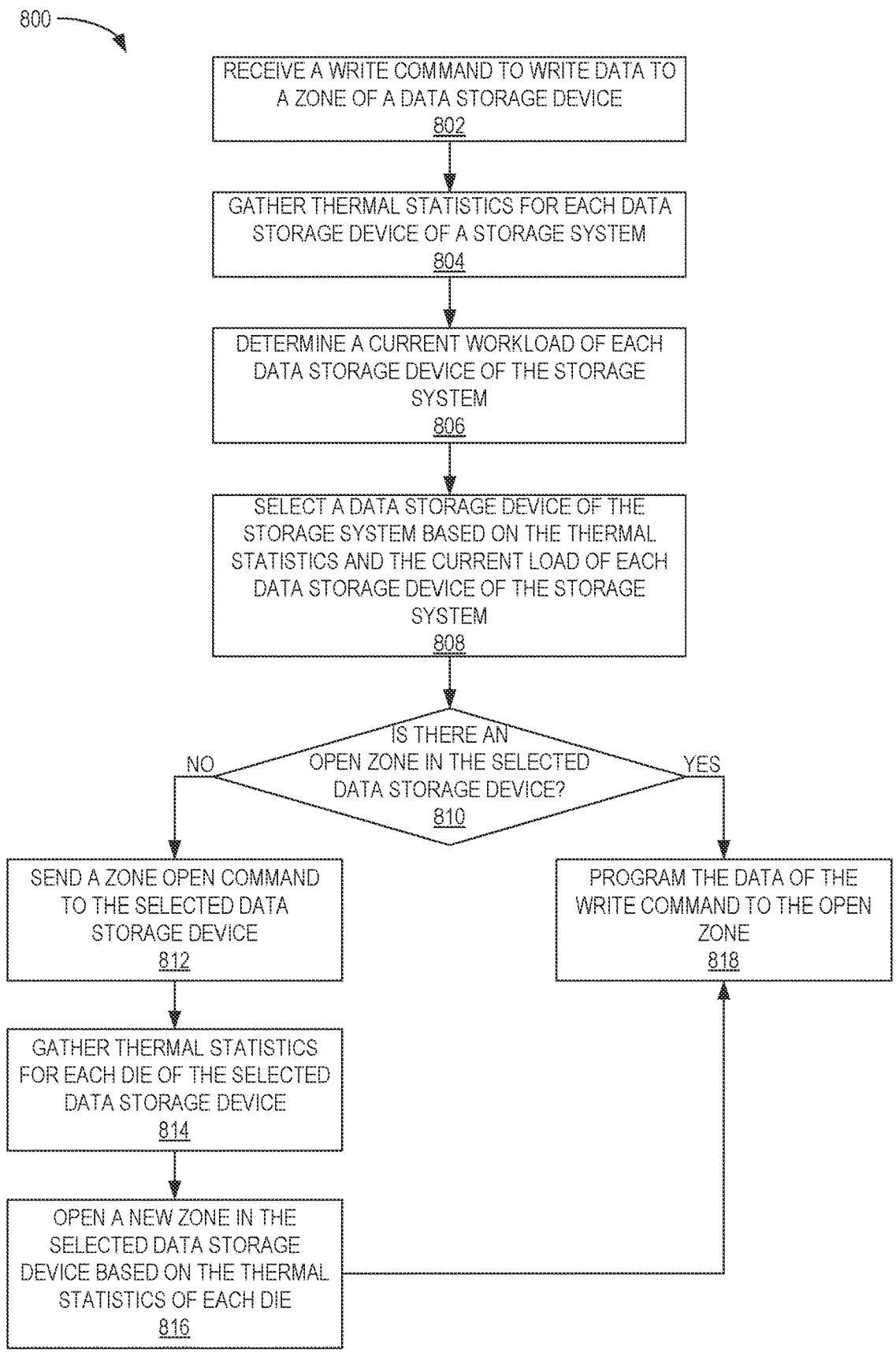
FIG. 8 is a flow diagram illustrating a method of processing a write command in a storage system having load balancing based on thermal statistics and a future workload, according to certain embodiments.

FIG. 8 is a flow diagram illustrating a method 800 of processing a write command in a storage system, such as the storage system 600 of FIG. 6, having load balancing based on thermal statistics and a future workload, according to certain embodiments. Aspects of the storage system 600 of FIG. 6 and the storage system 100 of FIG. 1 may be referenced herein for exemplary purposes. For example, method 800 may be implemented by controller 606.

At block 802, the controller 606 receives a write command to write data to a zone of a data storage device of the plurality of data storage devices 614a-614n from the host device 602. At block 804, the controller 606 gathers the thermal statistics of each data storage device of the plurality of data storage devices 614a-614n. In some examples, the gathering/collecting of the thermal statistics occurs continuously. At block 806, the controller 606 determines a current workload of each data storage device of the plurality of data storage devices 614a-614n. At block 808, the controller 606 selects a data storage device of the plurality of data storage devices 614a-614n based on the thermal statistics and the workload of each data storage device. The data storage device selected may be based on a thermal requirement optimization scheme, such as the rebalancing scheme described above.

At block 810, the controller 606 determines if there is an open zone in the selected data storage device. If there is an open zone in the selected data storage device at block 810, then the controller 606 sends the write command to a controller of the data storage device, where the controller of the data storage device programs the data of the write command to the open zone at block 818. However, if there is not an open zone in the selected data storage device at block 810, then the controller 606 sends a zone open command to the selected data storage device at block 812. At block 814, a controller of the selected data storage device gathers the thermal statistics of the plurality of dies. At block 816, the controller of the selected data storage device opens a new zone based on the thermal statistics of the plurality of dies. At block 818, the controller 606 sends the write command to a controller of the data storage device, where the controller of the data storage device programs the data of the write command to the open zone.

By balancing workload and opening new zones based on thermal statistics of each data storage device in a storage system including a plurality of data storage devices and the plurality of dies within each memory device of each data storage device, the system performance of the storage system may be improved.

In one embodiment, a storage system includes two or more data storage devices, where each data storage device of the two or more data storage devices includes zoned namespace (ZNS) architecture, and a controller coupled to the two or more data storage devices. The controller is configured to collect thermal statistics for each data storage device of the two or more data storage devices, analyze the collected thermal statistics, and designate a zone by selecting one or more dies within at least one data storage device of the two or more data storage devices based on the analyzed collected thermal statistics.

The controller is further configured to receive a zone open command and program host data to the designated zone. Receiving the zone open command occurs prior to analyzing the collected thermal statistics. Collecting the thermal statistics occurs continuously. Analyzing the collected thermal statistics occurs during an offline storage system management period. The selected one or more dies has a first thermal statistic and a remaining one or more dies has a second thermal statistic. The first thermal statistic is less than the second thermal statistic. The first thermal statistic and the second thermal statistic are temperature profiles. The controller is further configured to select the one or more dies based on a predicted workload. The two or more data storage devices are arranged in rows and columns in order to permit airflow therebetween. A first data storage of the two or more data storage devices has a first thermal statistic and a second data storage device of the two or more data storage devices has a second thermal statistic. The first thermal statistic is different from the second thermal statistic. The first data storage device is located a first distance from an airflow source and the second data storage device is located a second distance from the airflow source. The first distance and the second distance are different. Analyzing the collected thermal statistics includes analyzing a thermal statistic of a first data storage device and at least one of a thermal statistic of a second data storage device and a thermal statistic of a third data storage device. The second data storage device is disposed directly adjacent to the first data storage device and the third data storage device is disposed diagonally adjacent to the first data storage device. The second data storage device is a plurality of data storage devices and the third data storage device is a plurality of data storage devices. Each data storage device of the two or more data storage devices includes a plurality of dies. The controller is configured to select one or more dies of the plurality of dies based on collected thermal statistics of the plurality of dies to form the zone.

In another embodiment, a data storage device includes a memory device having zoned namespace (ZNS) architecture, where the memory device includes a plurality of dies, and a controller coupled to the memory device. The controller is configured to collect thermal statistics for each die of the plurality of dies, analyze the collected statistics, and allocate one or more dies of the plurality of dies to form a zone.

The thermal statistics for each die of the plurality of dies is based on at least a usage of the die, a proximity of the die to an airflow source of the data storage device, and a temperature of an adjacent die to the die. The controller is further configured to provide a host device with the collected thermal statistics, receive a workload based on the provided collected thermal statistics, and rebalance an access queue of the data storage device based on the workload received and the analyzed collected thermal statistics. The controller is further configured to receive a workload type indication from the host device, receive the thermal statistics from a thermal statistics gathering module, where the thermal statistics gathering module is disposed in the controller, and rebalance an access queue of the data storage device based on the workload type indication received and the analyzed collected thermal statistics.

In another embodiment, a storage system includes two or more memory means and a controller coupled to the two or more memory means. The controller is configured to allocate a zone formed from a portion of one or more of the two or more memory means based on thermal statistics of each memory means of the two or more memory means.

The storage system is an enterprise storage system. The storage system is a client storage system.

While the foregoing is directed to embodiments of the present disclosure, other and further embodiments of the disclosure may be devised without departing from the basic scope thereof, and the scope thereof is determined by the claims that follow.

What is claimed is:

1. A storage system, comprising:
   two or more data storage devices, wherein each data storage device of the two or more data storage devices includes zoned namespace (ZNS) architecture, and wherein the two or more data storage devices are arranged in rows and columns in order to permit airflow therebetween; and
   a controller coupled to the two or more data storage devices, wherein the controller is configured to:
   collect thermal statistics for each data storage device of the two or more data storage devices;
   analyze the collected thermal statistics, wherein analyzing the collected thermal statistics further comprises determining a thermal impact of allocating a command to a data storage device on thermal statistics of adjacent data storage devices to the data storage device; and
   designate a zone by selecting one or more dies within at least one data storage device of the two or more data storage devices based on the analyzed collected thermal statistics.

2. The storage system of claim 1, wherein the controller is further configured to:
   receive a zone open command; and
   program host data to the designated zone.

3. The storage system of claim 2, wherein receiving the zone open command occurs prior to analyzing the collected thermal statistics.

4. The storage system of claim 1, wherein collecting the thermal statistics occurs continuously.

5. The storage system of claim 1, wherein analyzing the collected thermal statistics occurs during an offline storage system management period.

6. The storage system of claim 1, wherein the selected one or more dies has a first thermal statistic and a remaining one or more dies has a second thermal statistic, wherein the first thermal statistic is less than the second thermal statistic, and wherein the first thermal statistic and the second thermal statistic are temperature profiles.

7. The storage system of claim 1, wherein the controller is further configured to select the one or more dies based on a predicted workload.

8. The storage system of claim 1, wherein:
a first data storage of the two or more data storage devices has a first thermal statistic and a second data storage device of the two or more data storage devices has a second thermal statistic; and
the first thermal statistic is different from the second thermal statistic.

9. The storage system of claim 8, wherein:
the first data storage device is located a first distance from an airflow source and the second data storage device is located a second distance from the airflow source; and
the first distance and the second distance are different.

10. The storage system of claim 1, wherein analyzing the collected thermal statistics comprises analyzing a thermal statistic of a first data storage device and at least one of a thermal statistic of a second data storage device and a thermal statistic of a third data storage device, and wherein the second data storage device is disposed directly adjacent to the first data storage device and the third data storage device is disposed diagonally adjacent to the first data storage device.

11. The storage system of claim 10, wherein the second data storage device is a plurality of data storage devices and the third data storage device is a plurality of data storage devices.

12. The storage system of claim 1, wherein each data storage device of the two or more data storage devices includes a plurality of dies, and wherein the controller is configured to select one or more dies of the plurality of dies based on collected thermal statistics of the plurality of dies to form the zone.

13. A data storage device, comprising:
a memory device having zoned namespace (ZNS) architecture, wherein the memory device includes a plurality of dies, and wherein the plurality of dies are arranged in rows and columns in order to permit airflow therebetween; and
a controller coupled to the memory device, wherein the controller is configured to:
collect thermal statistics for each die of the plurality of dies;
analyze the collected thermal statistics, wherein analyzing the collected thermal statistics further comprises determining a thermal impact of allocating a command to a data storage device on the thermal statistics of adjacent data storage devices to the data storage device; and
allocate one or more dies of the plurality of dies to form a zone.

14. The data storage device of claim 13, wherein the thermal statistics for each die of the plurality of dies is based on at least a usage of the die, a proximity of the die to an airflow source of the data storage device, and a temperature of an adjacent die to the die.

15. The data storage device of claim 13, wherein the controller is further configured to:
provide a host device with the collected thermal statistics;
receive a workload based on the provided collected thermal statistics; and
rebalance an access queue of the data storage device based on the workload received and the collected thermal statistics.

16. The data storage device of claim 13, wherein the controller is further configured to:
receive a workload type indication from a host device;
receive the thermal statistics from a thermal statistics gathering module, wherein the thermal statistics gathering module is disposed in the controller; and
rebalance an access queue of the data storage device based on the workload type indication received and the collected thermal statistics.

17. A storage system, comprising:
two or more memory means, wherein the two or more memory means are arranged in rows and columns in order to permit airflow therebetween; and
a controller coupled to the two or more memory means, wherein the controller is configured to allocate a zone formed from a portion of one or more of the two or more memory means based on an analysis of collected thermal statistics of each memory means of the two or more memory means, wherein the analysis of the collected thermal statistics further comprises determining a thermal impact of allocating a command to a memory means of the two or more memory means on thermal statistics of adjacent memory means of the two or more memory means to the memory means.

18. The storage system of claim 17, wherein the storage system is an enterprise storage system.

19. The storage system of claim 17, wherein the storage system is a client storage system.

* * * * *